May 11, 1954  J. K. NORTHROP ET AL  2,678,176
ELEVATOR DAMPER SYSTEM
Filed Jan. 29, 1952  2 Sheets-Sheet 1

INVENTORS:
JOHN K. NORTHROP
WARDE L. PARKER
THOMAS A. FEENEY

THEIR PATENT ATTORNEY

May 11, 1954

J. K. NORTHROP ET AL 2,678,176

ELEVATOR DAMPER SYSTEM

Filed Jan. 29, 1952

INVENTORS:
JOHN K. NORTHROP
WARDE L. PARKER
THOMAS A. FEENEY

THEIR PATENT ATTORNEY

Patented May 11, 1954

2,678,176

UNITED STATES PATENT OFFICE 2,678,176

ELEVATOR DAMPER SYSTEM

John K. Northrop, Pacific Palisades, and Warde L. Parker and Thomas A. Feeney, Los Angeles, Calif., assignors to Northrop Aircraft, Inc., Hawthorne, Calif., a corporation of California Application January 29, 1952, Serial No. 268,722

14 Claims. (Cl. 244—75)

This invention relates to airplanes and more particularly to means for damping and preventing flutter of movable control surfaces on high-speed airplanes.

In high-speed airplanes having thin airfoils and control surfaces subjected to high air loads, wherein space does not permit installation of the required actuating mechanism within the outlines of the surface, vibrations can cause structural deflections which have been known to reach destructive magnitudes. This is particularly true with any unbalanced control surface, i. e., not mass-balanced about the hinge line. The flutter problem arises as a result of self-excited vibrations which start structural oscillations of relatively high frequencies and finally expand to literally shake off a critically affected cantilevered part, for example.

Accordingly, it is an object of the present invention to provide a flutter damper installation in an airplane to prevent the building up of flutter of a control surface about its hinged attachment, at all speeds and conditions of flight.

It is known that certain damper units have been devised for the purpose of damping out vibrations of a surface or part hinged to a more solid structure. The damper comprises one member to be held in some manner by the relatively solid structure and another member to be held by or mounted on the hinged surface. The damper unit thus extends across the joint or gap from the so-called structural part to the movable part so that internally restricted relative movement of the damper members occurs with deflection of the hinged part.

If the damper unit could be accurately aligned with respect to the hinge axis, the problem would be solved. However, even with the most accurate alignment practically and economically obtainable, absolute coaxial rotation of the hinged surface and the damper cannot be achieved, thus resulting in binding of the associated elements to such an extent that the hinged surface freezes up and becomes immovable. Even if absolute jamming of the surface and damper units does not occur, the operational loads and stresses in the affected structure at deflected positions of the movable surface are excessive.

It is, therefore, another object of this invention to provide a flutter damper installation for an airplane control surface wherein the surface can be swung through its entire range without binding of any kind due to misalignment of the damper center of rotation with the center line of the surface hinge, while at the same time minimizing lost motion before action of the damper. A further object is to provide a fail-safe means which will allow operation of the surface in the event of failure of a damper unit.

Our invention will be more fully understood by reference to the following detailed description of a specific embodiment thereof, and to the accompanying drawings.

Figure 1:
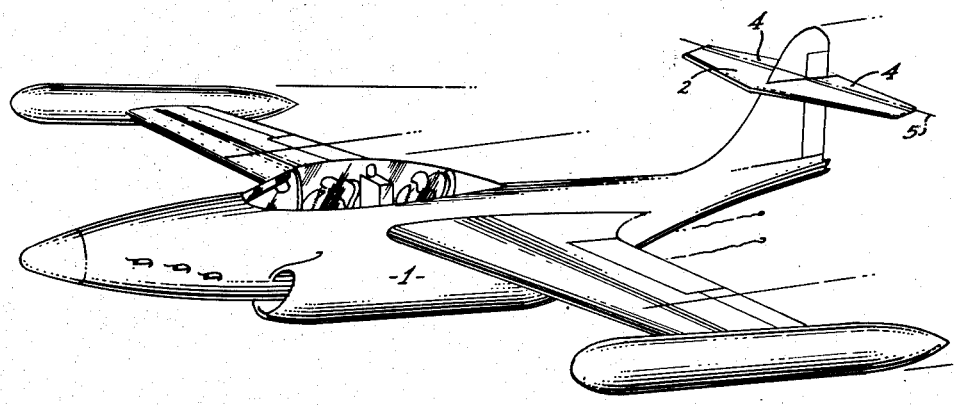
Figure 1 is a perspective view of an airplane having the elevator surfaces provided with a flutter damper installation according to the present invention.
Figure 2:
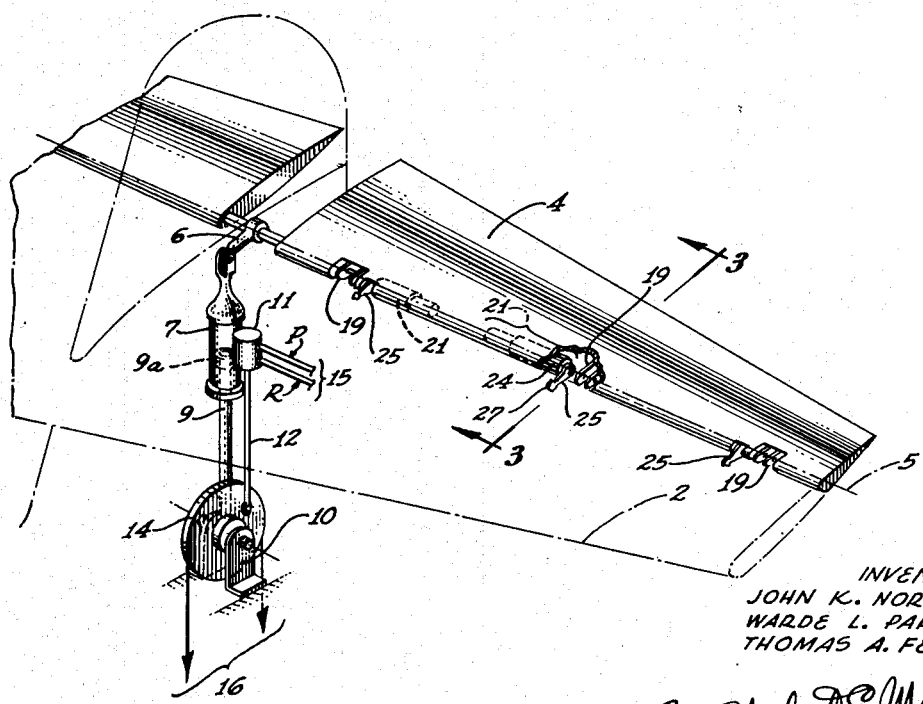
Figure 2 is a perspective view of the elevator left side, showing hinge points, damper locations, and elevator control actuator.

Referring to Figure 1 and 2, an airplane has a horizontal stabilizer 2 and an elevator surface 4 hinged to the stabilizer 2 at three points on each side of the airplane center line, along an elevator hinge line 5. The elevator actuating components are located within the airplane structure near the center line, and comprise an actuating lever 6 fixed to rotate with the elevator 4 about the hinge line 5, and a hydraulic actuating cylinder assembly 7 pivotally connected at 90° to the lever 6. The system shown is a full power system wherein a piston rod 9 of the cylinder assembly is pivotally connected to a stationary bracket 10, the piston rod 9 having the customary piston 9a attached to one end thereof and operating within the cylinder. The housing of the cylinder 7 moves with the elevator 4 and has a control valve casing 11 attached rigidly to the cylinder 7. A valve control rod 12 operates valving within the valve casing 11 and extends out parallel to the piston rod 9 to pivotally connect to a cable-operated control quadrant 14 which is also rotatable in the bracket 10 fixed to aircraft structure. Hydraulic pressure and return lines 15 for operation of the actuating cylinder assembly 7 are supplied through the valve casing 11.

Thus. movement of the quadrant 14 by cables 16 will displace the valve rod 12 to cause deflection of the elevator 4 to a new position dependent upon the amount of quadrant rotation at which new position the cylinder 7 and valve casing 11 will have moved relative to the valve rod 12 to close the valve again and halt the elevator 4.

The elevator 4 in a typical high-speed airplane embodiment is only about 2.75 inches thick at the leading edge, so that it is very difficult to mount any actual actuating mechanism inside the elevator 4 or stabilizer 2 directly at the hinge points. Therefore, the elevator 4 becomes less rigid outwardly from the airplane center line to the elevator tips, and more susceptible to flutter.

Figure 3:
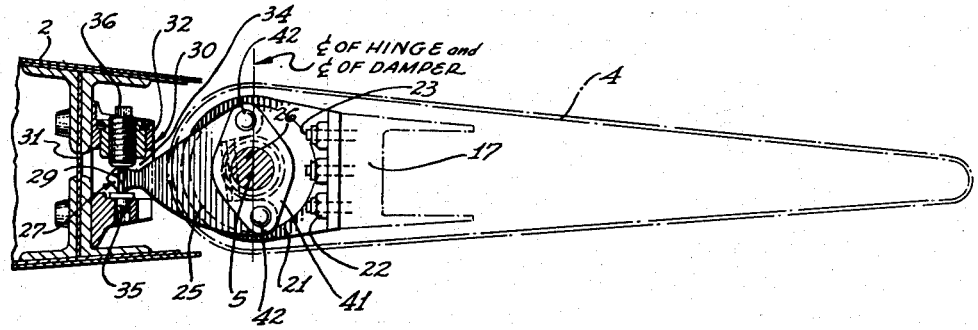
Figure 3 is a cross-sectional view of the elevator and part of the horizontal stabilizer at one of the damper units, showing attachment of the damper unit, and taken as indicated by the line 3—3 in Figure 2.

To the rear of the hinge line 5 in the elevator 4, a main spar 17 (Figure 3) extends the length of the elevator. To the spar 17 are fixed hinge fittings 19 which are bored at the hinge line 5 to receive hinge bolts, after being aligned in mounting position with respect to additional hinge fittings 20 (Figure 4) projecting rearwardly from the stabilizer 2. Closely adjacent each elevator hinge fitting 19, a damper unit 21 is securely mounted on the main spar 17 by attachment nuts 22 and spar studs 23, as shown in Figures 2 and 3. The dampers are installed within the confines of the elevator surface. Each damper unit 21 comprises a housing 24 and a forwardly projecting arm 25 movable relative to the housing 24. The arm 25 rotates with a damper shaft 26 positioned with its longitudinal axis substantially coincident with the elevator hinge line 5.

The damper units 21 are of the hydraulic vane type having a predetermined restriction through which a fluid must be forced in order to rotate the shaft 26 in either direction. The dampers themselves form no part of the present invention and will not be described in detail.

When the elevator 4 is installed, the basic damper principle is to retain the arm 25 in the stabilizer 2 so that deflection of the elevator 4 turns the damper housing 24 but not the arm 25. Vibrations will thus be damped and rapid oscillations of the elevator 4 prevented, due to the hydraulic restrictive action. However, we have found that if the damper arm 25 is merely pinned or rigidly attached to the stabilizer 2, for example, with the axis of the shaft 26 even slightly displaced from the elevator hinge line 5, deflections of the elevator 4 will cause excessive stresses in the structure and parts making up the loop consisting of the hinge fittings, stabilizer and elevator structure, and damper linkage across the hinge line 5. These stresses seriously impair operation of the elevator and are often sufficient to cause complete jamming inside of the damper unit 21. This is due, of course, to the rotation of the elevator 4 and damper unit 21 about two different axes, caused by manufacturing tolerances and small structural deflections. Even if the damper shaft 26 is successfully aligned with the hinge line 5 at one elevator position, actuation of the elevator to other positions and back again, loads up all connection points in reverse directions; and since some backlash is bound to be present, this reversal of loads results in disturbing the relative positions of the two axes of rotation. The problem of binding is therefore still present.

Figure 4:
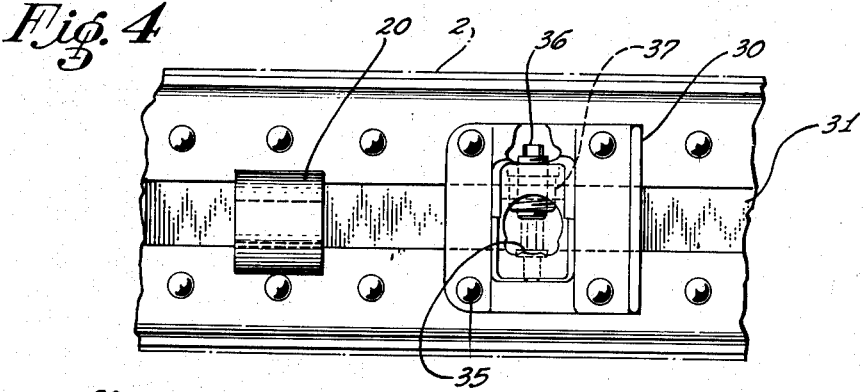
Figure 4 is a view looking forward at a damper arm attachment fitting in the rear of the horizontal stabilizer.
Figure 5:
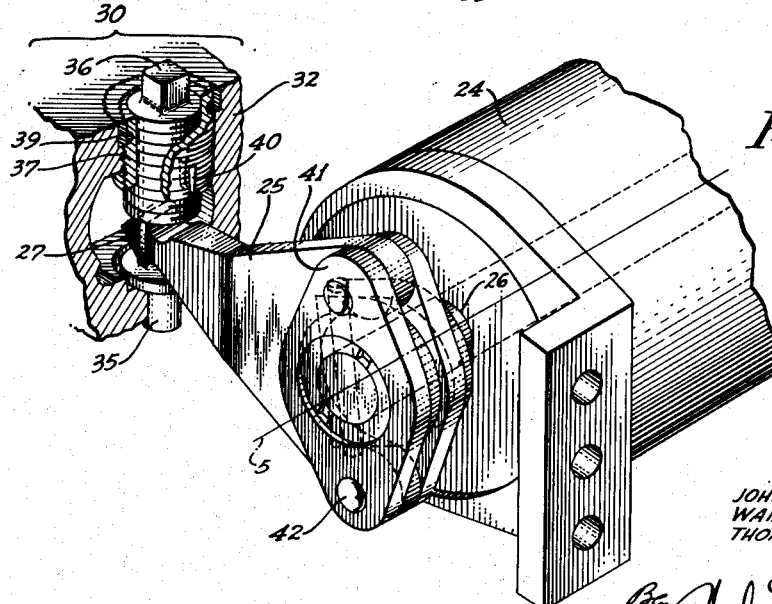
Figure 5 is a perspective view of one end of a damper unit, showing the damper lever arm attachment to the unit and in the forward fitting.

The present invention solves the damper system problems by several means. As shown in Figure 2, the responsibility for damping is divided between the six damper units 21 (three on each side of the airplane center line) so that failure of any one damper will not seriously affect operation of the airplane. The dampers are located just beside the hinge points, which are the best points for efficient absorption of flutter energy. In addition, this mounting confines loads due to rotation of the damper to a small area near each hinge. Another feature for making a successful flutter damper installation is the novel means by which the damper arm 25 is mounted in the stabilizer, as shown in Figures 3, 4, and 5. The arm 25 is provided with a head 27 having two opposite short plane surfaces 29 forming bearing surfaces for confinement of the arm 25 in a vertical direction. The head 27 fits into an arm fitting 30 mounted within the stabilizer 2.

The arm fitting 30 is attached to a shear web 31 in the stabilizer and comprises a foundation member 32 containing a rearward opening 34 bounded at the bottom by a flat-topped bushing 35 and at the top by a smooth-ended adjustment bolt 36 installed in a threaded insert 37 in the member 32. A retaining element 39 holds the insert 37 from turning, and the insert has locking grooves 40 by which the insert may be compressed before assembly, to lock the position of the adjustment bolt 36. Surfaces such as the bearing surfaces 29, the top of the bushing 35, and the bottom of the bolt 36 are preferably case hardened.

When the elevator 4 is installed, the head 27 of the arm 25 fits into the opening 34 with the bearing surfaces 29 directly between the bushing 35 and the end of the bolt 36. The bearing surfaces 29 are made sufficiently short in the fore-and-aft direction so that misalignment of components in the vertical direction will not cause arm binding with elevator rotation. Proper bolt adjustment is attained by making the clearance between the head 27 and the fitting surfaces small enough so that practically no measurable lost motion of the head 27 in a vertical direction occurs, but large enough so that the head can easily slide in a fore-and-aft direction as needed. An actual value of this close-fit clearance, for example, is about .001 inch.

It is thus seen that, in operation of the elevator 4, any misalignment of the damper shaft center line and the actual line of the elevator hinge during rotation will result in a slight fore-and-aft translation of the arm 25 relative to the arm fitting 30. Therefore, this action prevents any and all binding or excessive stresses at the hinge points and in the damper units 21. The lost motion of the complete installation before relative movement of the damper components occurs and damping action starts, is only .06° of elevator rotation, with the arm clearance adjustment as previously described. This angle is considerably less than that which would occur as free motion due to backlash in the elevator connections if the dampers were omitted. The damper system can thus limit oscillations of the elevator 4 to a very small amplitude, falling far short of any dangerous flutter. Since it would be difficult to provide enough force to stop any high degree flutter after it had started, the object is to prevent the undesirable situation from starting, which the present invention does.

As a specific example of the requirements of the damper units 21, each damper in this described embodiment gives a torque coefficient of more than 50 pound-feet for each radian per second. This coefficient must be demonstrated under test conditions of plus and minus 0.25° amplitude from a given neutral position and a frequency of 3000 cycles per minute.

The safety feature mentioned hereinbefore is best shown in Figures 3 and 5. The arm 25 is U-shaped at the damper end, and is attached to a collar 41 of the damper unit 21 by two special size rivets 42. The collar 41 is solidly fixed to the shaft 26, with no backlash. The rivets 42 are designed to be the weakest members of the damper installation, and they will shear off at a torque load of between 300 and 400 pound-feet, for example. Thus, if the damper unit 21 jams internally, the rivets 42 will break at their designed load, and the arm 25 will rotate freely on the collar 41 to insure further elevator control movement.

From the above description, it is readily seen that a flutter damper installation which will attain the objects set forth has been provided. The damper system of the present invention is especially suited for use with a full power surface control sysetem, because of the high operating torque required to move the surface. With the present invention, weight can be saved by eliminating the usual heavy balancing structure ahead of the surface hinge line, and leaving the surface entirely unbalanced.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. In an airplane having a movable surface member hinged to another member along a hinge line, a flutter damper system comprising a plurality of damper units each having two coaxially rotatable elements wherein oscillations of said elements are damped, each of said damper units being mounted with its axis of relative coaxial rotation on said hinge line, one of said damper elements mounted rigidly on one of said members, and the other element slidably mounted in the other member, the direction of allowable sliding being along a line substantially intersecting said hinge line at a right angle, and means confining said other element from circumferential movement about said hinge line.

2. In an airplane having a movable surface member hinged to another member along a hinge line, a flutter damper system comprising a plurality of damper units each having a base element and an arm having damped rotation relative to said base element, said damper units mounted with the rotational axis of said arm on said hinge line, said base element being rigidly attached to one of said members, arm mounting means fixed to the other of said members in position to receive the outer end of said arm, said mounting means having bearing surfaces to just contact opposite sides of said arm end to prevent said arm from moving relative to said mounting means in a circumferential direction about said rotational axis, said arm resting between said bearing surfaces with no obstructions to prevent sliding of said arm in a line substantially intersecting said rotational axis and said hinge line at a right angle.

3. Apparatus in accordance with claim 2 wherein one of said bearing surfaces is adjustably related to said mounting means to vary the clearance between said bearing surfaces and said arm as desired.

4. Apparatus in accordance with claim 2 wherein one of said bearing surfaces comprises a flat end of a bolt threaded into said mounting means in a direction toward the other of said bearing surfaces.

5. Apparatus in accordance with claim 2 wherein each of said arms is fastened to its respective damper unit by easily replaceable means having a designed working strength below that of any other part in said damper unit and above that required for normal operational loads, whereby in the event of excessive binding or jamming of said damper unit, said replaceable means will break and allow free rotation of said arm relative to said base element.

6. In an airplane having an unbalanced hinged control surface actuated about its hinge line by a full power control system, means for preventing flutter of said surface comprising a flutter damper unit having two members with damped relative rotation therebetween mounted with its axis of rotation on said hinge line, one of said members attached rigidly to said surface, and the other member slidably fitting into the part to which said surface is hinged, the direction of sliding being along a line substantially intersecting said hinge line at a right angle, and means for confining said other member from circumferential movement about said hinge line, whereby deflection of said member is equal to the deflection of said surface, and whereby no stresses are incurred as a result of misalignments of said damper rotational axis with said hinge line.

7. In an airplane, the combination of an unbalanced control surface member hinged to another member of said airplane along a hinge line, full power control means for actuating said surface about said hinge line, a flutter damper unit having two elements with damped relative rotation therebetween mounted with its axis of rotation on said hinge line, one of said elements attached rigidly to one of said members, and the other element slidably fitting into the other member, the direction of allowable sliding being along a line substantially intersecting said hinge line at a right angle, and means attached to said other member for confining said other element against circumferential motion about said hinge line.

8. Apparatus in accordance with claim 7 wherein one of said damper elements contains easily replaceable joining means having a designed strength below that of any other part in said damper unit in the direction of resistance encountered when said elements are relatively operated, and above that required during normal surface operation, whereby said replaceable means will be the component which breaks first in case of jamming of said damper unit, to allow unrestricted relative rotation of said damper elements.

9. In an airplane, the combination of an unbalanced control surface member hinged at a plurality of hinge points to another member of said airplane along a hinge line, full power control means for actuating said surface about said hinge line, an equal plurality of flutter damper units each having two elements with damped relative rotation therebetween, one of said damper units located closely adjacent each of said hinge points, respectively, with the rotational axes of said damper units on said hinge line, one of said damper elements of each unit attached rigidly to one of said members, the other element of each damper unit slidably fitting into the other member, the direction of allowable sliding being along a line substantially intersecting said hinge line at a right angle, and means attached to said other member for confining said other element of each damper unit against circumferential motion about said hinge line.

10. In an airplane, the combination of an unbalanced control surface hinged at a plurality of hinge points to a member of said airplane along a hinge line, an equal plurality of flutter damper units each having a base element and an arm having damped rotation relative to said base element, one of said damper units located closely adjacent each of said hinge points, respectively, with the rotational axes of said arms on said hinge line, said base element of each damper unit being rigidly attached to said control surface, a plurality of arm mounting means fixed to said airplane member in position to receive the outer ends of said arms, respectively, each of said mounting means having bearing surfaces to just contact opposite sides of its respective arm to prevent said arms from moving relative to said mounting means in a circumferential direction about said hinge line, each of said arms resting between said bearing surfaces with no obstructions to prevent sliding of said arm in a line substantially intersecting said hinge line at a right angle.

11. In a high-speed airplane having thin airfoils, the combination of a control surface member hinged at a plurality of hinge points to another member of said airplane along a hinge line, a full power control system for operating said surface member and having actuator means connected to said surface member near the center of the span thereof, only, an equal plurality of flutter damper units each having a housing element and an arm having damped rotation relative to said housing element, one of said damper units located closely adjacent each of said hinge points, respectively, with the rotational axes of said arms on said hinge line, said housing element of each damper unit being rigidly attached to one of said members, a plurality of arm fitting means attached to the other of said members in position to receive the outer ends of said arms, respectively, the outer end of each arm having a head portion with two opposite relatively short plane parallel surfaces on the radially spaced sides of said head, each of said fitting means having bearing surfaces spaced to just contact the short surfaces of its respective arm head to prevent said arm from moving relative to said fitting means in a circumferential direction about said hinge line, each of said arm heads resting between said bearing surfaces with no obstructions to prevent sliding of said arm in a line substantially intersecting said hinge line at a right angle.

12. Apparatus in accordance with claim 11 wherein one of said bearing surfaces is adjustably mounted in said fitting means to vary the distance between said bearing surfaces, and including means for locking said adjustable bearing surface in any position of adjustment, at least the contact surfaces on said head being surface hardened.

13. In an airplane having a flutter damper unit of the rotational type mounted on the hinge line of a movable surface to prevent build-up of vibratory oscillations of said surface, means for eliminating excessive stresses and binding of parts due to misalignment of the damper units axis and said hinge line, comprising an arm attached to and forming the sole external connection of one of the rotationally damped members of said unit, said arm extending in a radial direction from the operating axis of said unit, the other damped member of said unit secured rigidly to said surface, arm fitting means attached to a member of said airplane upon which said surface is hinged, in position to slidably receive said arm, said fitting means having bearing surfaces spaced to just contact opposite sides of said arm to prevent said arm from moving relative to said fitting means in a circumferential direction about said hinge line, said arm resting between said bearing surfaces with no obstructions which would prevent sliding of said arm in a line substantially intersecting said hinge line at a right angle.

14. In an airplane having a flutter damper unit of the rotational type mounted with its operational axis on the hinge line of a movable surface member hinged to an airplane member, said damper being attached rigidly to one of said members and having a damped element to be connected to the other member, connection means comprising an arm fixed to said damped element and extending in a radial direction from said axis, two opposite relatively short plane parallel surfaces on the radially spaced sides of said arm near the outer end thereof, and arm fitting means attached to said other member in position to receive the outer end of said arm, said fitting means having bearing surfaces spaced to just contact the short surfaces of said arm to prevent said arm from moving relative to said fitting means in a circumferential direction about said hinge line, and said arm resting between said bearing surfaces with no impediments which would prevent sliding of said arm in a line substantially intersecting said hinge line at a right angle, whereby no binding stresses occur as a result of slight misalignments of said damper unit axis and said hinge line.

References Cited in the file of this patent

UNITED STATES PATENTS

| Number | Name | Date |
|---|---|---|
| 1,458,278 | De Bretteville et al. | June 12, 1923 |
| 1,729,210 | Delage | Sept. 24, 1929 |